US006690811B2

(12) United States Patent
Au et al.

(10) Patent No.: US 6,690,811 B2
(45) Date of Patent: Feb. 10, 2004

(54) METHODS AND APPARATUS FOR HIDING DATA IN HALFTONE IMAGES

(75) Inventors: Oscar Chi-Lim Au, Kowloon (HK); Ming Sun Fu, Kowloon (HK)

(73) Assignee: The Hong Kong University of Science and Technology, Kowloon (HK)

( * ) Notice: Subject to any disclaimer, the term of this patent is extended or adjusted under 35 U.S.C. 154(b) by 602 days.

(21) Appl. No.: 09/732,022

(22) Filed: Dec. 8, 2000

(65) Prior Publication Data

US 2002/0106102 A1 Aug. 8, 2002

(51) Int. Cl.⁷ .................................. G06K 9/00

(52) U.S. Cl. .................. 382/100; 382/252; 283/94; 358/3.03; 358/3.28

(58) Field of Search ................. 382/100, 135, 382/137, 181, 279, 252; 380/54, 210, 252, 287; 283/17, 72, 93, 94, 902; 713/176; 358/3.03, 3.06, 3.28

(56) References Cited

U.S. PATENT DOCUMENTS

| 3,675,948 | A |   | 7/1972  | Wicker               |
|-----------|---|---|---------|----------------------|
| 5,315,098 | A | * | 5/1994  | Tow .............. 235/494 |
| 5,337,361 | A |   | 8/1994  | Wang et al.          |
| 5,396,559 | A |   | 3/1995  | McGrew               |
| 5,488,664 | A | * | 1/1996  | Shamir ............ 380/54 |
| 5,734,752 | A | * | 3/1998  | Knox ............. 358/3.28 |
| 5,790,703 | A |   | 8/1998  | Wang                 |
| 5,995,638 | A | * | 11/1999 | Amidror et al. ...... 382/100 |
| 6,249,588 | B1 | * | 6/2001 | Amidror et al. ...... 382/100 |

* cited by examiner

*Primary Examiner*—Samir Ahmed
*Assistant Examiner*—Anand Bhatnagar
(74) *Attorney, Agent, or Firm*—Burns, Doane, Swecker & Mathis, L.L.P.

(57) ABSTRACT

We propose modifying the error-diffusion method for transforming a grey-scale image into a halftone image, so that binary data is hidden in the resulting halftone image. Simultaneously, a second halftone image is generated by error diffusion, not storing the hidden data. The hidden binary data is typically a binary image, and the dark regions of this binary image can be seen when the two halftone images are overlaid.

18 Claims, 19 Drawing Sheets

METHODS AND APPARATUS FOR HIDING DATA IN HALFTONE IMAGES

FIELD OF THE INVENTION

The present invention relates to methods and apparatus for producing a halftone image including embedded data, such as data indicating the origin of the image. In particular the data is embedded such that it can be revealed by comparison of the halftone image with a second halftone image.

BACKGROUND OF THE INVENTION

Nowadays, digital images can be distributed easily through the Internet and the Web. As a side effect, the problems of copyright infringement and authentication are growing rapidly with the ease of distribution. One possible solution is to hide within the images "watermarking" data such as identity of the company which produced the image, the owner of the image, its creation date and time, for copyright protection and authentication purposes. The embedded watermarking data should not be visible.

Halftoning is a method widely used to transform multi-tone images (typically "grey-scale" images with 256 levels at each pixel, although in this document the term multi-tone is used to imply merely that there are at least 3 levels, or more preferably at least 10 levels) into a "halftone" image having only two tone colors (i.e. 2 levels) at each pixel. Such methods are used widely, for example in computer printers and for publishing newspapers, magazines and books. From a distance, halftoned images resemble images with multi-tones. The two most commonly used halftoning techniques are known as "ordered dithering" (see B. E. Bayers, "An optimum method for two level rendition of continuous tone pictures", Proc. of IEEE Int. Communication Conf., pp2611–2615, 1973) and "error diffusion" (R. W. Floyd, L. Steinberg, "An adaptive algorithm for spatial greyscale", Proc. SID, pp 75–77, 1976). Typically, the second of the two techniques produces half-tone images of higher quality.

Ordered dithering is a computationally simple and effective halftoning method. It employs a "screen" having at each pixel a pseudo-random value, and sets the tone of the halftone value at each pixel according to whether the grey-tone value at that pixel is higher or lower than the pseudo-random value. With ordered dithering, the average local intensity within a screen region of the generated halftone image corresponds approximately to that of the original grey-tone image. Unfortunately, the technique introduces a high level of undesirable noise and gives low image quality.

Error diffusion is a more advanced technique usually used in certain printers. It is more complicated than ordered dithering, but it can generate halftone images with higher visual quality. It is a single pass algorithm (i.e. pixels are processed in a single sweep across the image. For example, the method may process the rows one-by-one from top to bottom of the image, and, for each row, process the pixels one-by-one along the row, e.g. left to right; clearly these orders may be varied, e.g. by processing successive columns rather than rows). In error diffusion, the halftoning output is obtained by comparing the grey-tone value of each given pixel with a fixed threshold, and generating a halftone value according to the result of the comparison. The halftoning error generated in this way (for example, in the case of a pixel having a grey-tone value below the threshold, the halftoning error for that pixel is the grey-tone value itself) is fed forward to its adjacent neighbors, specifically to pixels which are later in the single pass across the image performed by the algorithm. For those adjacent pixels the halftone values are calculated by comparing the threshold with a sum of the grey-tone values for those pixels plus a fraction of the error value fed forward. In other words, each image pixel effectively has an adaptive threshold. The error feedback helps to make the local average intensity of the halftone image approximately equal to the original multi-tone image (neglecting any trivial constant factor arising because from the definition of the two possible halftone values (e.g. either 0 or 255 whereas the multi-tone values are in the range 0 to 255)). An essential component of error diffusion is its error feedback kernel, which determines the proportion of the error fed from a given pixel to each of its adjacent pixels. Different kernels can have quite different behaviour. Two commonly used error feedback kernels are the Jarvis kernel and the Steinberg kernel shown in Tables 1 and 2 respectively.

The Jarvis kernel has a large support and tends to give halftone images with high contrast and coarse texture. The Steinberg kernel has smaller support and gives halftone images with fine texture and good contrast. In each case, each element of tables 1 and 2 refers to a respective pixel. The element with an entry marked "x" refers to the pixel currently being processed. Each numerical entry shows the weighting on the pixel presently being processed from the error caused by halftoning in the pixel with the numerical entry.

TABLE 1

The Jarvis kernel

| 1 | 3 | 5 | 3 | 1 |
|---|---|---|---|---|
| 3 | 5 | 7 | 5 | 3 |
| 5 | 7 | X |   |   |

TABLE 2

The Steinberg kernel

| 1 | 3 | 5 |
|---|---|---|
| 7 | X |   |

There have been quite a number of watermarking methods designed for natural grey scale images. However, few, if any, of the algorithms can be applied to halftone images. This is because halftone images have only 2 tones and have a large amount of high frequency noise resulting in little intensity redundancy. Few image processing operations can be performed on halftone images without creating serious perceptual artifacts.

The present inventors have recently proposed a technique in which data is hidden in a half-tone image at individual data storage pixels chosen using a pseudo-random number generator. At each data storage pixel, the halftone value is fixed at a value determined by the data to be hidden.

In a first case, the data is hidden within an existing halftone image. Hiding the data requires reversing the tone value at about half of the data storage pixels. For such pixels, the tone value of one of the adjacent pixels is also reversed—to maintain the local average intensity.

In a second case, the data is hidden while the half-tone image is generated from a grey-scale image by error diffusion. In the case of the data storage pixels, the halftone value is determined by the data to be hidden. The error caused by doing this (i.e. the difference between the grey-tone value of the original image for that pixel and the halftone value determined by the data to be hidden) is fed to adjacent pixels, as in error diffusion. However, this error may be fed not only to pixels which are ahead in the sweep across the image, but also to pixels which are earlier in the single pass across the image (i.e. the kernel is "non-causal").

In both of these cases, the hidden data is regenerated by using the same pseudo-random algorithm to determine the data storage pixels. This algorithm is very effective in hiding a large amount of data with very low degradation of the half-tone image (e.g. 4096 bits of hidden data in a 512×512 image).

In certain applications, however, it is preferable for the data to be hidden so that it can be extracted more rapidly from the half-tone image. For example, it would be useful if the data could be extracted from a digitised half-tone image by a method which does not require knowledge or use of a pseudo-random algorithm. In some applications it would be advantageous if the method can be performed directly on a printed image without the need for scanning it.

U.S. Pat. Nos. 5,709,703, 5,734,752, 5,488,664, 5,315,098 and 5,296,559 all relate to methods of generating a halftone image including hidden data by ordered dithering. Generally speaking, they transform a multi-tone image into two halftone images by ordered dithering using respective screens. A first screen is composed of random grey-tone values at each pixel. A second screen is composed of random grey-tone values correlated with the first screen in some portions, and grey-tone values uncorrelated with the first screen in other portions. When the two halftone images are superimposed, the portions in which the two screens are correlated have a different average intensity from portions in which the screens are uncorrelated, and in this way the correlated portions are revealed. The locations of these correlated portions can be used to encode the hidden data.

A major disadvantage of such techniques, however, is that since they employ ordered dithering, the quality of the halftone images is low.

SUMMARY OF THE INVENTION

The present invention seeks to provide a new and useful way of generating a halftone image incorporating hidden data.

In general terms the invention proposes that error diffusion is used to generate two halftone images from a single multi-tone image. The two halftone images are identical in one or more portions ("background portions"), but only statistically correlated in one or more other portions ("foreground portions"). The set of data to be hidden determines the partition of the pixel array into the background portions and foreground portions (i.e. the locations of the centres of the portions, and the shapes of the portions). The two sorts of portions can be revealed by comparison of the images. In fact, as explained below, the locations and shapes of the portions are normally visible when the two halftone images are superimposed.

Preferably, the respective local average intensities of the two halftone images are approximately the same (possibly neglecting a trivial constant factor) throughout the images (both being equal to the local average intensity of the original multi-tone image, for example), but the "phase" of the two half-tone images is different in the foreground portion(s) of the images.

One way for this to be realised is for a first of the two halftone images to be generated by a conventional error diffusion process. The background portions of the second of the two halftone images may be generated by copying the first halftone image. The foreground portions of the second image may be generated by an error diffusion process, in which the error fed from the background portions of the second image is different from the error fed from the corresponding portions during the creation of the first image.

A further possibility within the scope of the invention is to use an error diffusion process to generate a third halftone image, hiding a second set of hidden data. In other words, the second hidden data would define a second partition of the array into a foreground portion and a background portion. The third halftone image would be identical to the first halftone image in the second background portion, and merely correlated with it in the second foreground portion. Thus, if the second image and the third image are compared, they only match in those portions of the images which are in the background according to both sets of hidden data; the portions of the second and third images which differ, represent areas which are in one or other of the two foreground regions. Such areas may be visible if the second and third areas are superimposed.

Preferably, the two sets of data hidden in the respective images are complementary, in the sense that the two sets of data encode information (a third data set) which cannot be derived from either of the two sets of hidden data alone. For example, this further information may be encoded as a correlation between the first and second data sets.

BRIEF DESCRIPTION OF THE FIGURES

Embodiments of the invention will now be described, for the sake of example only, with reference to the accompanying figures.

DETAILED DESCRIPTION OF THE EMBODIMENTS

Figure 1:
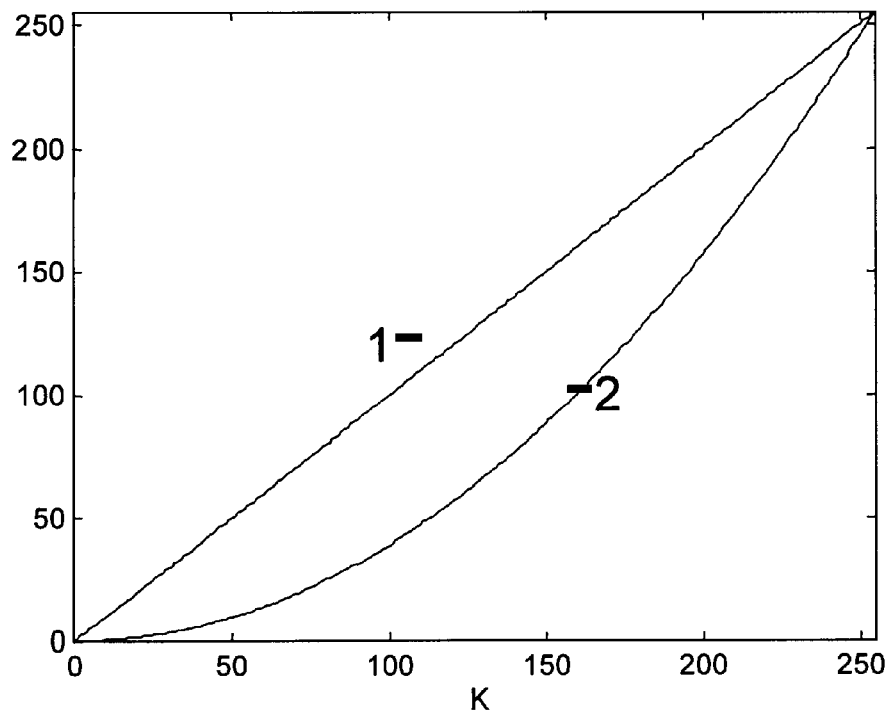
FIG. 1 shows the two functions K and $K^2/255$.
Figure 2:
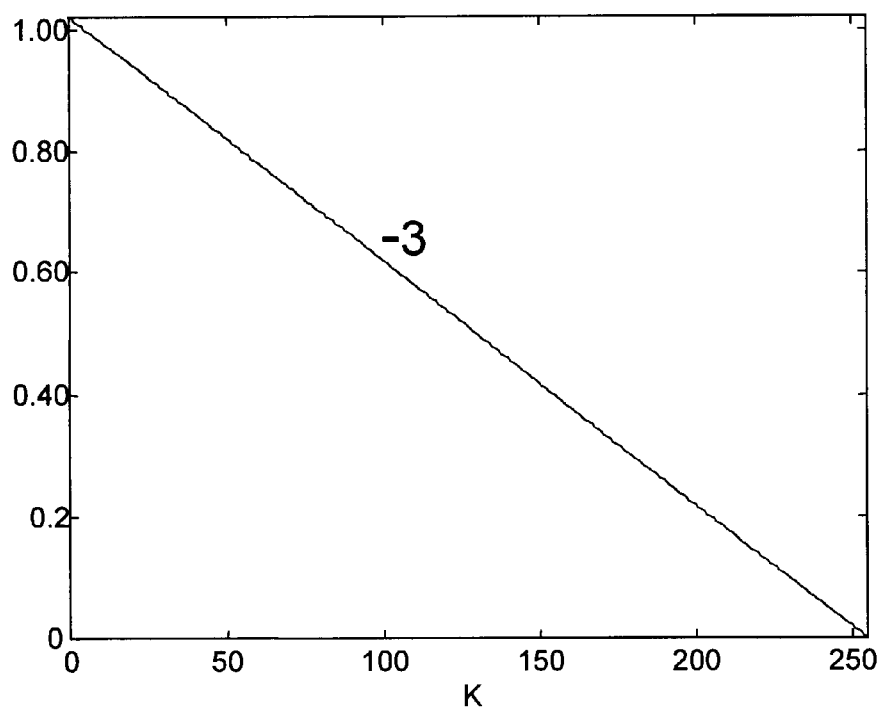
FIG. 2 illustrates the function $1-(K/255)$.

The two embodiments of the invention will now be described. Each embodiment operates on a multi-tone image R of M×N pixels (i.e. a rectangular array of M×N pixels), where M may be equal to N. A given pixel of R is denoted R(i,j), where i and j are integers in the range 1 to M, and 1 to N, respectively.

The first ("simple") embodiment generates two M×N halftone images $A_1$ and $A_2$, which together hide a binary image H, of size M×N, i.e. the same size as $A_1$ and $A_2$. H can be visually decoded or read by overlaying the two images $A_1$ and $A_2$.

In the example shown in the figures, the black pixels (i.e. H(i, j)=0) in the hidden image H contain meaningful foreground information such as text or logo or other graphics. Typically, this text or logo or graphics should not contain very fine features because fine features usually cannot be retrieved from the halftone images generated by the embodiments. The white pixels in H correspond to a background. Note that although we have selected this correspondence of background and foreground to white and black respectively, the invention may be operated with the opposite correspondence.

In the simple mode, the first image $A_1$ is generated by regular error diffusion with no hidden visual patterns. The second image $A_2$ is generated with some kind of stochastic properties relative to the first image. The hidden binary image H is used to turn on or off the stochastic properties. For regions corresponding to white pixels (background) in H, the pixels in these regions in $A_2$ are forced to be identical to the co-located pixels of $A_1$. In other words, pixels in these regions are copied from the first image $A_1$ to the second image $A_2$. For regions corresponding to black pixels (foreground) of H, a modified error diffusion process is applied to generate $A_2$ using the same kernel as in $A_1$ (so that the texture and the look-and-feel of the regions is very similar to, if not the same as, the corresponding regions in $A_1$). The error diffusion in $A_2$ is modified in the sense that the error diffusion texture has a different (stochastic) phase relative to that in $A_1$.

We will now demonstrate that the logical AND of $A_1$ and $A_2$ tends to be zero in these regions. Consider a pixel at location (i,j) within a smooth region of intensity K ($0 \leq K \leq 255$). Let the intensity of this pixel in image $A_1$ be $X_1$. Typically, in regular error diffusion, $$P(X_1 = 255) = \frac{K}{255} \text{ and } P(X_1 = 0) = 1 - \frac{K}{255}$$

such that the expected value of $X_1$ is $$E(X_1) = 255 * P(X_1 = 255) + 0 * P(X_1 = 0) = 255 * \frac{K}{255} + 0 * \left(1 - \frac{K}{255}\right) = K$$

Consider a pixel in $A_2$ at the same location (i,j) and having value $X_2$. Define $$Y = \min(X_1, X_2)$$

which is effectively the logical AND of $X_1$ and $X_2$.

If (i,j) is a background pixel in H such that H(i,j)=1, then $X_2$ is identical to $X_1$ and thus $$P(Y = 255) = P((X_1 = 255) \cap (X_2 = 255)) = P(X_1 = 255) = \frac{K}{255}$$

$$E(Y) = 255 * P(Y = 255) + 0 * P(Y = 0) = 255 * \frac{K}{255} + 0 * \left(1 - \frac{K}{255}\right) = K$$

If (i,j) is a foreground pixel in H such that H(i,j)=0, then $X_2$ is independent of $X_1$ such that $$P(Y = 255) = P((X_1 = 255) \cap (X_2 = 255)) =$$
$$P(X_1 = 255) * P(X_2 = 255) = \left(\frac{K}{255}\right)^2$$

and thus $$E(Y) = 255*P(Y=255) + 0*P(Y=0) = 255*\left(\frac{K}{255}\right)^2 + 0*\left[1-\left(\frac{K}{255}\right)^2\right] = \frac{K^2}{255}$$

The function of E(Y) for the foreground pixel is plotted against K as line 2 in FIG. 1, and it is less than or equal to K for all values of K. For the sake of comparison, line 1 shows the value of K, i.e. the E(Y) of the background pixels.

Consequently, the pixels in $A_1 \cap A_2$ corresponding to the foreground regions in H tend to be darker than the original image intensity, and thus the foreground portion of H is visible. As the human eye tends to be sensitive to the contrast rather than the intensity, it is useful to examine the contrast. The contrast is $$\frac{\Delta Z}{Z} = \frac{K - K^2/255}{K} = \frac{255 - K}{255},$$

which suggests that the contrast is high at dark regions but low at bright regions.

Figure 3:
FIG. 3 shows a 512×512 halftone image generated from a 512×512 grey-scale image by error diffusion.
Figure 4:
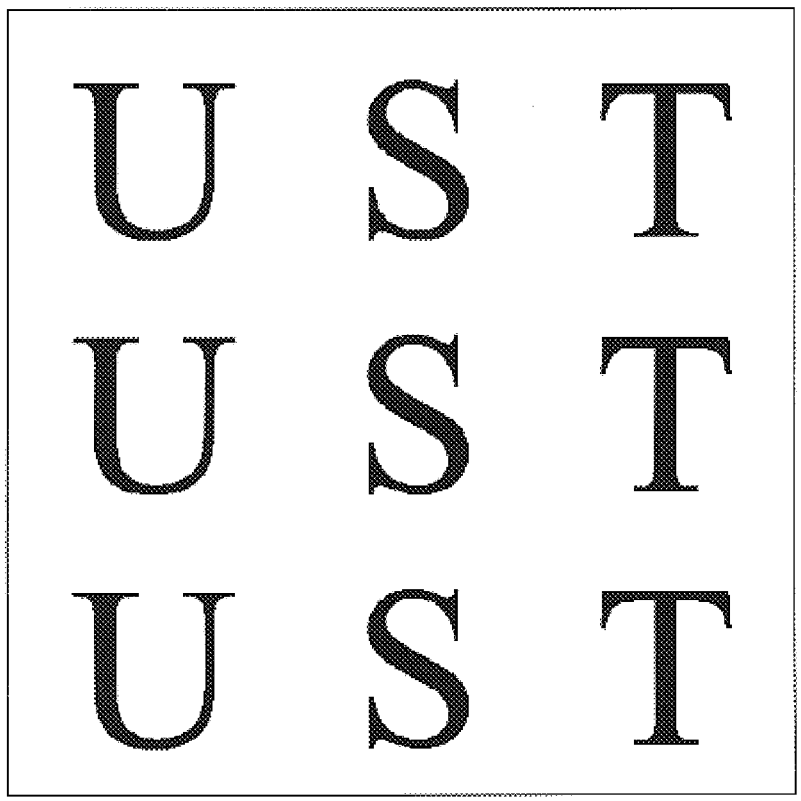
FIG. 4 shows how a set of data to be embedded in a halftone image, defines a partition of a 512×512 pixel array into foreground portions (shown as black pixels) and background portions (shown as white pixels).
Figure 5:
FIG. 5 shows a 512×512 halftone image generated from a 512×512 grey-scale image by error diffusion using a method according to the invention and embedding the set of data shown in FIG. 4.
Figure 6:
FIG. 6 shows a superposition of the images of FIGS. 3 and 5.

An example of the use of this first ("simple") embodiment of the invention is shown in FIGS. 3 to 6. FIG. 3 is the first image $A_1$ which is the 512×512 grey-tone image (in fact, this is a standard test image, known as "Lena") transformed into a grey-tone image by error diffusion using the Jarvis kernel. FIG. 4 shows a binary pattern H, in which each pixel is white (background) or black (foreground). FIG. 5 is second image $A_2$, which is produced from grey-tone "Lena" by error diffusion with the Jarvis kernel and with the binary pattern H in FIG. 4 embedded, as described in detail below. FIG. 6 is the logical AND of FIGS. 3 and 5. The pattern H in FIG. 4 can be clearly seen in FIG. 6. Note that in FIG. 6 the contrast of H is better in dark regions than in bright regions.

The second ("advanced") embodiment of the invention employs two different hidden binary images, $H_1$ and $H_2$, of size M×N and different from each other. As before, a first halftone image $A_1$ is generated from a grey-scale image using conventional error diffusion. The two binary images $H_1$ and $H_2$ are embedded into respective M×N halftone images, $A_2$ and $A_3$. The second image $A_2$ is used to hide the first binary image $H_1$. The third image $A_3$ is used to hide the second binary pattern $H_2$. $H_1$ and $H_2$ may be different. Both $A_2$ and $A_3$ are good-looking halftone images with the same look and feel as $A_1$. When $A_2$ and $A_3$ are overlaid on top of one another, $H=H_1 \cap H_2$ will become visible. Actually, when $A_1$ and $A_2$ are overlaid, $H_1$ will be visible. When $A_1$ and $A_3$ are overlaid, $H_2$ will be visible.

Figure 7:
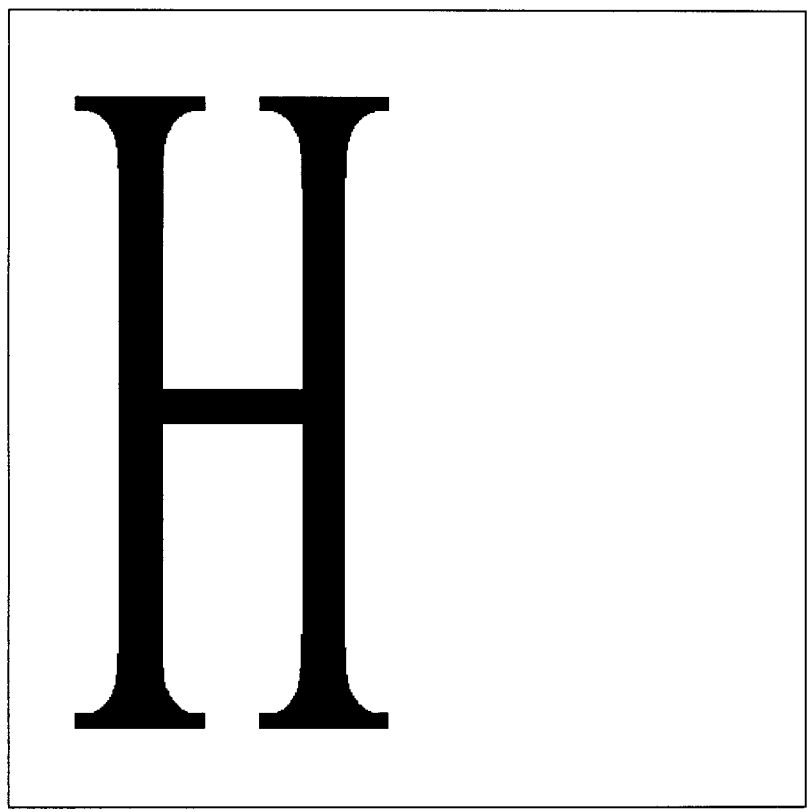
FIG. 7 shows a 512×512 array showing a partition determined by a first set of data to be embedded in a halftone image.
Figure 8:
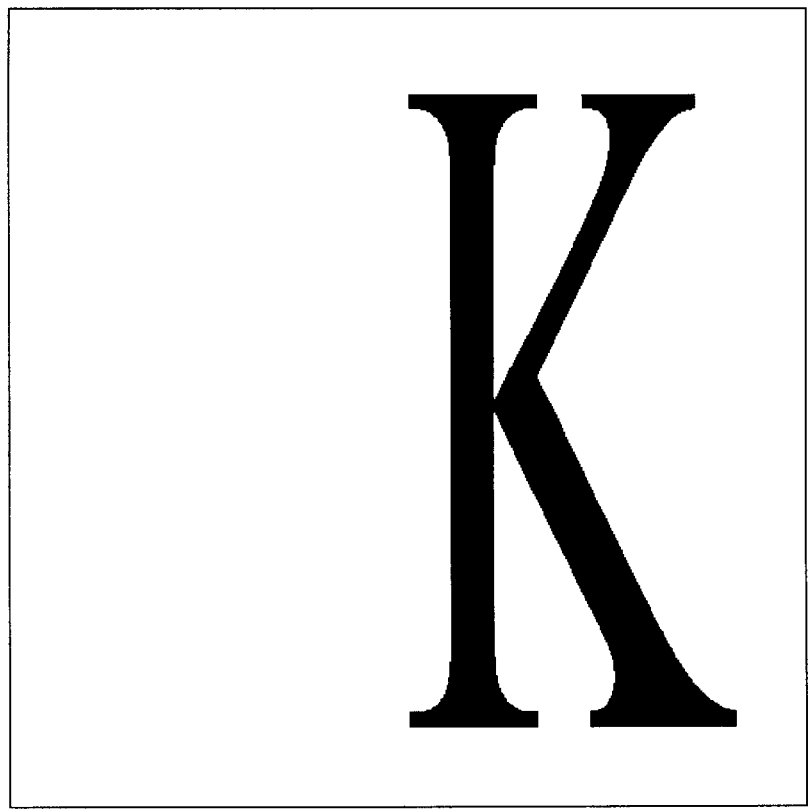
FIG. 8 shows a 512×512 array showing a partition determined by a second set of data to be embedded in a halftone image.
Figure 9:
FIG. 9 shows an image generated by a second embodiment of the invention and encoding the first set of data represented by FIG. 7.
Figure 10:
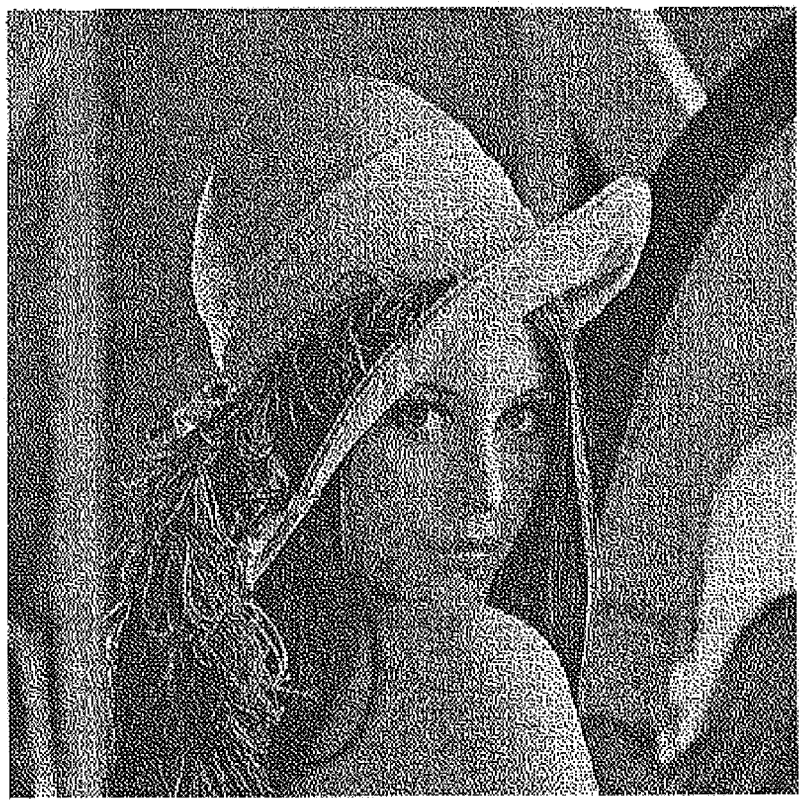
FIG. 10 shows an image generated by the second embodiment of the invention and encoding the second set of data represented by FIG. 8.
Figure 11:
FIG. 11 is a superposition of FIGS. 7 and 8.
Figure 12:
FIG. 12 is a superposition of FIGS. 9 and 10.
Figure 13:
FIG. 13 is a superposition of FIGS. 3 and 9.
Figure 14:
FIG. 14 is a superposition of FIGS. 3 and 10.

An example of the second embodiment is shown in FIGS. 7 to 14. FIG. 7 is the binary hidden image $H_1$. FIG. 8 is the binary hidden image $H_2$. For the sake of this example, the binary hidden images $H_1$ and $H_2$ are chosen so that the foreground portions of $H_1$ and $H_2$ do not overlap, but this is not a necessary feature of the invention. The first halftone image remains image $A_1$, and is of course still as shown in FIG. 3. The second and third halftone images $A_2$ and $A_3$ are shown in FIGS. 9 and 10 respectively. Both $A_2$ and $A_3$ look the same as $A_1$. FIG. 11 is the $H=H_1 \cap H_2$, the logical AND of FIGS. 7 and 8. FIG. 12 is the logical AND of $A_2$ and $A_3$. The pattern of H can be clearly seen in FIG. 12. FIG. 13 shows the logical AND of $A_1$ and $A_2$. The $H_1$ can be seen clearly. FIG. 14 shows the logical AND of $A_1$ and $A_3$ showing the hidden $H_2$.

We will now explain in detail the processes used to generate $A_1$ and $A_2$ (the method for generating $A_3$ is the same as that for generating $A_2$, except that the dataset H is replaced with $H_2$).

$A_1$ is produced by regular error diffusion. Specifically, at each pixel location (i,j), a value f(i,j) related to the current multi-tone pixel value x(i,j) is compared with a threshold T (T=128). The halftone output y(i,j) will be 0 if f(i,j)<T and 255 if f(i,j)≧T. The error e(i,j) at all pixel locations are fed forward or diffused to the future pixels by a causal kernel. Note that e(i,j) is not the difference of x(i,j) and y(i,j), but the difference of f(i,j) and y(i,j). Suppose the causal kernel is the Steinberg kernel in Table 2. The f(i,j) is the sum of the current pixel value x(i,j) and the feed-forward error a(i,j) as follows.

$$a(i,j) = \frac{1}{16}[e(i-1, j-1) + 5e(i-1, j) + 3e(i-1, j+1) + 7e(i, j-1)] \quad (1)$$

$$f(i,j) = x(i,j) + a(i,j) \quad (2)$$

$$y(i,j) = \begin{cases} 0 & f(i,j) < T \\ 255 & \text{otherwise} \end{cases} \quad (3)$$

$$e(i,j) = f(i,j) - y(i,j) \quad (4)$$

Any change in the causal kernel (e.g. using the Jarvis kernel instead of the Steinberg kernel) causes a change in Eqn. 1 but not in Eqns. 2 to 4.

Figure 15:
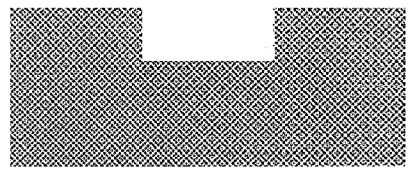
FIG. 15 illustrates in grey a foreground portion of an image, defined by a data set.
Figure 16:
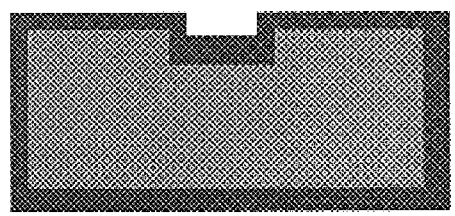
FIG. 16 illustrates in a margin constructed around the foreground portion of FIG. 15 by an embodiment of the invention.

A method we refer to here as stochastic error diffusion (SED) is applied to produce $A_2$. We will now explain SED. Note that the binary hidden image H contains a finite number of connected black foreground regions, some large and some small. Consider any black connected foreground region B (shown in grey in FIG. 16) as shown in FIG. 15. Dilation (an image morphological operation) with some structuring element is applied to get an expanded region as shown in FIG. 16. In this case the structuring element is a (2L+1)×(2L+1) square matrix with the current pixel being the centre, so C is basically region B expanded outward both horizontally and vertically by L pixels (preferably L=1). Define region D as the dark region outside B in FIG. 16, and the region C as the total of the two regions D and B (i.e. D=C∩B̄). (Note that although dilation is used in this embodiment of the invention, region C can in principle be defined as any region encompassing and extending beyond B).

All pixels of $A_2$ which are not in the foreground of H (i.e. all pixels not in B) are set to be equal to $A_1$. All pixels in B, however, are set as follows. Firstly, for each pixel (i,j) in the region C, we define a function ẽ(i,j) for each pixel. For pixels outside C we select ẽ(i,j)=0. Then, equations (5), (6) and (7) are applied to compute values ẽ(i,j), ã(i,j) and f̃(i,j) for each pixel in C, by a single pass across C (in the same sense as the single pass across the image used to produce $A_1$)

$$ã(i,j) = \frac{1}{16}[ẽ(i-1, j-1) + 5ẽ(i-1, j) + 3ẽ(i-1, j+1) + 7ẽ(i, j-1)] \quad (5)$$

$$f̃(i,j) = x(i,j) + ã(i,j) \quad (6)$$

$$ẽ(i,j) = \max(\min(f̃(i,j) - y(i,j), 127), -127) \quad (7)$$

ẽ(i,j) is different from e(i,j) in region C because of the boundary condition that ẽ(i,j) is zero when (i,j) is a pixel outside C. Nevertheless, equation (7) ensures that, like e(i,j), $\tilde{e}$(i,j) is in the range −127 to 127 ("clipped"). Thus, the local average value of $\tilde{e}$(i,j) is close to the local average of e(i,j), but its "phase" is different. In other words, $\tilde{e}$(i,j) can be considered as statistically uncorrelated with e(i,j) (actually a low degree of correlation may be tolerable in practice; for example, the local average of each provides a measure of how well $A_1$ represents the original image in region C).

Then, standard error diffusion (i.e. Eqns. (1) to (4)) is applied in a single pass across region B using $\tilde{e}$(i,j) in place of e(i,j) in equation (1) whenever e(i,j) represents a pixel outside B. In other words, within region B, $A_2$ only differs from $A_1$ because the error diffused into region B from outside is different from that used to find $A_1$. This way, the texture within region B will be the characteristic texture of the regular error diffusion, but the phase of the error diffusion texture in region B of $A_2$ would be different from the phase of the error diffusion texture in region B of $A_1$.

In a second "advanced" embodiment, SED is applied to hide $H_1$ in $A_2$ and to hide $H_2$ in $A_3$. For the white regions of $H_1$, at each pixel, $A_2$ is set to be equal to $A_1$. For the white regions of $H_2$, at each pixel $A_3$ is set to be equal to $A_1$. In all other ("foreground") regions, $A_2$ and $A_3$ are set as described above.

Figure 17:
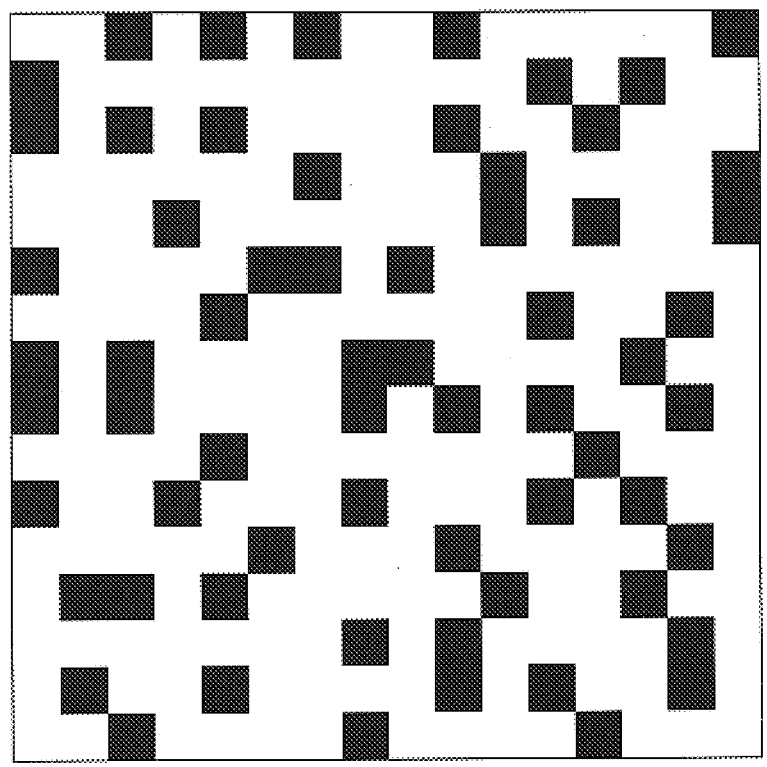
FIG. 17 shows foreground and background portions of an image, defined by a first data set, and used in a second embodiment of the invention.
Figure 18:
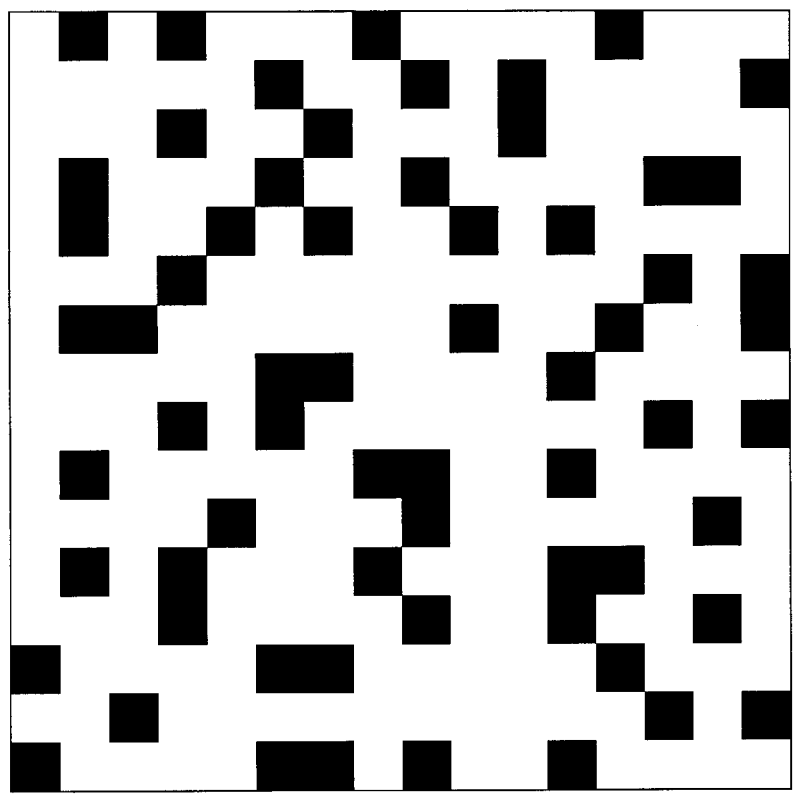
FIG. 18 shows foreground and background portions of an image, defined by a second data set, and used in the second embodiment of the invention.
Figure 19:
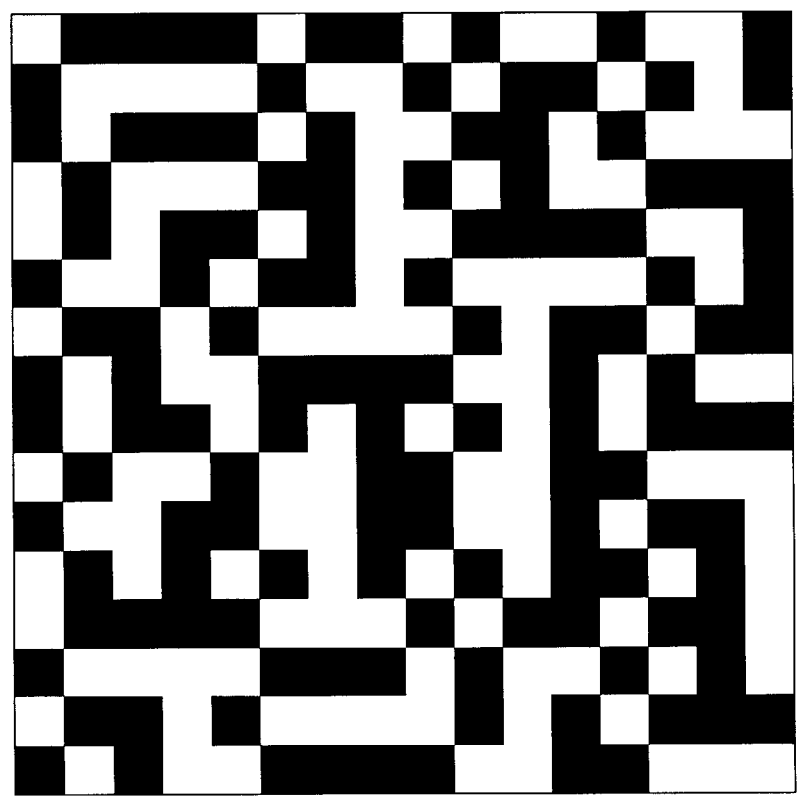
FIG. 19 shows a superposition of FIGS. 17 and 18.

Another example of the use of the second embodiment of the invention is illustrated in FIGS. 17 to 24. FIG. 17 shows foreground and background portions of a 512×512 image, defined by a first data set $H_1$, while FIG. 18 shows foreground and background portions of a second 512×512 image, defined by a second data set $H_2$. FIG. 19 shows a superposition of FIGS. 17 and 18. It will be seen that every 64×64 bit block of FIG. 19 (there are 8×8 such block) consists either of two 32×32 black squares which are vertically or horizontally aligned, or which are diagonally apart. If the squares are vertically or horizontally aligned this encodes a data bit "1", while if they are diagonally apart it encodes a data bit "0". In other words, the first data set $H_1$ and second data set $H_2$ have been generated from a third data set having 8×8=64 bits. Note that the third data set cannot be recovered from either of the first or second data sets individually.

Figure 20:
FIG. 20 shows a halftone image generated by the second embodiment of the invention and hiding the data represented by FIG. 17.
Figure 21:
FIG. 21 shows a halftone image generated by the second embodiment of the invention and hiding the data represented by FIG. 18.
Figure 22:
FIG. 22 shows a superposition of FIGS. 3 and 20.
Figure 23:
FIG. 23 shows a superposition of FIGS. 3 and 21.

FIG. 20 shows a first halftone image $A_2$ generated by the method explained above according to the first embodiment, hiding the first data set represented by FIG. 17. FIG. 21 shows a second halftone image $A_3$ generated by the method explained above according to the first embodiment, hiding the second data set represented by FIG. 18. FIG. 22 shows a superposition of FIGS. 3 and 20. FIG. 23 shows a superposition of FIG. 3 and 21.

Figure 24:
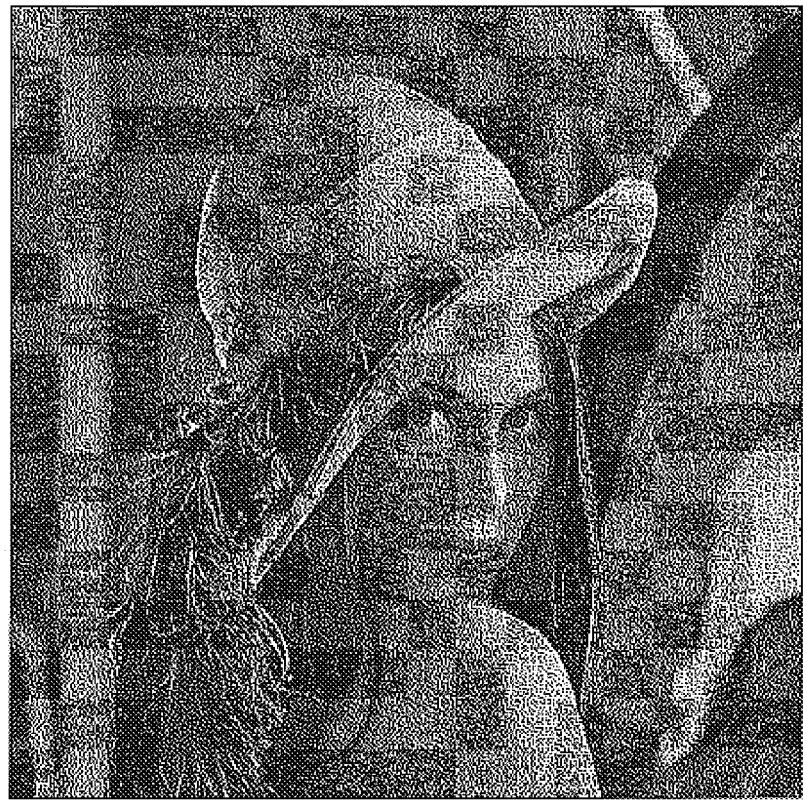
FIG. 24 shows a superposition of FIGS. 20 and 21.

FIG. 24 shows a superposition of FIGS. 20 and 21. In other words, the third data set can be retrieved using FIGS. 20 and 21.

Although the invention has been described above with relation to particular embodiments, many variations are possible within the scope of the invention as would be clear to a skilled person. In particular, SED is not the only method which ensures the error values $\tilde{e}$ fed into region B in generating $A_2$ are different from the error e fed into region B in generating $A_1$, Firstly, it is not necessary that the region D entirely surrounds the area B. For example, in the explanation of SED given above the portion of the area D which is to the bottom right of the area B will not have any effect on setting the $A_2$ pixels in B, since the single pass which determines these values feeds errors towards the bottom right. This portion of D can therefore be omitted, without changing $A_2$.

Secondly, the "clipping" (equation (7)) is merely preferable. Clipping is useful because in error diffusion, the error term is usually between −127 and 127. If we generate a number out of this range, we are doing more than necessary. Thus, clipping is preferable, but the method would work to some degree without the clipping.

Furthermore, there are several less preferable methods of generating values for error $\tilde{e}$ which can be fed into the region B to cause the different phase. For example, we could:

1) use a random number generator to generate an error $\tilde{e}$ in the range of −127 and 127 for pixels in region D. The disadvantage is that this may introduce significant mismatch, for example when e is +127 but the random number generator generates a value −127 which very far away.

2) use a random number generator to generate a random value δe(i,j) for each pixel in D, in the range of [a, b], where a and b are small integers (e.g. a may be small and negative such as −50, while b may be small and positive, such as 50). Then values $\tilde{e}$(i,j) for each pixel in D could be defined as $\tilde{e}$(i,j)=e(i,j)+δe(i,j).

3) Whereas SED sets the boundary condition that $\tilde{e}$(i,j)=0 for pixels outside C, we could set it for each pixel near C by a random number generator.

Furthermore, any combination of these ideas is also possible, with or without clipping.

Furthermore, it is not essential that the numbers should be truly random; pseudorandom numbers, or even a sequence of numbers with a relatively short repeat length (e.g. 10) may alternatively be used.

Furthermore, the invention (e.g. the second "advanced" embodiment) is not restricted to just generating two halftone images two images $A_2$ and $A_3$. It can generate L images (where L is an integer) $A_2, A_3, \ldots, A_{(L+1)}$, from L respective sets of hidden data $H_1, H_2, H_3, \ldots, H_L$. Each of the data sets may be hidden in the respective halftone image by a separate SED algorithm.

These respective sets of hidden data may themselves be derived by breaking the "foreground" of a single set of hidden data H (represented by an M×N array of pixels with binary values) into L regions. Each of these regions is the foreground portion of an image representing the respective set of data $H_1, H_2, H_3, \ldots, H_L$. If $A_2, A_3, \ldots, A_{(L+1)}$ are overlayed, the total hidden pattern representing H is revealed.

Alternatively, recall that in the analysis of SED given above, the reason why when $A_1$ overlies $A_2$ the foreground is darker than the background, is that $$P(Y=255)=P(X_1=255 \text{ and } X_2=255),$$

which is equal to $P(X_1=255)P(X_2=255)$ only when the images are uncorrelated. Thus, if we allow more than L=3 images to overlap, $$P(Y=255)=P(X_1=255 \text{ and } X_2=255 \text{ and } X_3=255 \text{ and } \ldots) \quad (8)$$

When these three images are uncorrelated, then this equation is equal to $P(X_1=255)P(X_2=255)P(X_3=255) \ldots$, but not otherwise.

More generally, when the final image is created by overlaying more than two half-tone images hiding data, we can achieve more than two darkness levels. In regions of average darkness k, for any given pixel If all halftone images are forced to be equal, P(Y=255)= k/255.

If the halftone images fall into two groups (each composed of one or more halftone images), and the binary values of that pixel are equal for all the images of each group, $P(Y=255)=(k/255)^2$.

If there are 3 groups, $P(Y=255)=(k/255)^3$.
If there are L groups, $P(Y=255)=(k/255)^L$.
The contrast between a region with L groups and L+1 groups is $k/255$, independent of L.

Furthermore, since error diffusion is causal (it may work from left to right, top to bottom, for example), the ẽ values of pixels in any region D on the right side, especially bottom right, of the foreground patterns are not used. This does not cause a problem when the Jarvis kernel is used. It may be possible, however, to vary the SED algorithm by using the non-causal error diffusion mentioned in the background section in the description of our previous method of hiding data in a halftone image (i.e. the values of $A_2$ pixels in image B may be affected also by error diffused from pixels in regions in D which are to their bottom right). In this way, even the parts of region D on the right side of the foreground patterns are utilized.

Furthermore, although the invention has been described above in relation to black-and-white images, it is not limited in this respect. For example, any of the halftone images may be a single component of a three-colour printing scheme.

The invention has been explained above on the basis that hidden image is of size M×N pixels, and thus that the hidden data is NM bits in length. However, the invention is not limited in this respect. Indeed, it is highly preferable for the hidden data to have a much lower information content, since it can only be extracted from the halftone images statistically, and thus with noise.

Preferably, for example, the hidden image consists of relatively large contiguous foreground or background regions (e.g. containing at least 20, 50, 100 or even 1000 pixels), so that they can easily be seen, and their approximate shape determined, when the halftone images are superimposed. If the hidden data is limited to data sets defining such a partition, then clearly it must represent much fewer than NM statistically independent bits.

As a further example, the hidden image input to an embodiment of a method according to the example, may be of size M'×N' where $M'=((M-D_1)/L)$ and $N'=((N-D_2)/J)$ for some I, J=1, 2, 3, . . . (integers) and for some $D_1 \geq 0$ and $D_2 \geq 0$. Then the hidden image can be enlarged by a factor of L horizontally and a factor of J vertically before being placed on the original image for embedding (i.e. a portion of pixel array of size L×M'×J×N' is defined as representing this image, and the rest of the pixel array defined as background (or in some embodiments, foreground)). If L and J are significantly larger than 1 (e.g. 4 or more), then even if the digits of the data represented by the hidden image are statistically independent, the image which is eventually hidden in the halftone images will have large regions of foreground and background (i.e. at least 4 pixels wide).

In the second embodiment, the key-image $A_1$ can be used as a hidden-image reader. It can be overlaid with $A_2$ or $A_3$ to "read" the hidden image $H_1$ and $H_2$. While this is desirable in some applications, it may be undesirable in others because R may be a publicly available image and thus anyone can generate $A_1$.

By contrast, the third embodiment (which is an "advanced" variation on the second embodiment) is designed such that the key-image cannot be used to read the desired hidden image. Instead, the key-image can only read a "disguised" hidden image. As in the first embodiment, the black regions of the desirable hidden binary image H are assumed to be the foreground (the pattern of interest) while the white regions are assumed to be the background. The foreground of H contains two disjoint portions: a publicly viewable portion and a private portion. The publicly viewable portion should be viewable when the key-image is overlaid but the private portion should not. With the two disjoint foreground portions, H can decomposed into two images $$H = H_{public} \cup H_{private}$$

where $H_{public}$ and $H_{private}$ are two mutually disjoint M×N binary images whose black regions are the publicly viewable portion and the private portion of the foreground of H respectively. An M×N binary disguise image $H_{disguise}$ is constructed such that its black regions contain the private portion (black regions of $H_{private}$) but not the publicly-viewable portion (the black region of $H_{public}$). Another M×N binary disguise image $H_{disguise2}$ is constructed from $H_{disguise}$ such that its black regions contain some dilated version of the black regions of $H_{disguise}$ but not the black region of $H_{public}$. Let $H_{public,B}$, $H_{private,B}$, $H_{disguise,B}$, and $H_{disguise2,B}$ be the collection of the black pixel locations of $H_{public}$, $H_{private}$, $H_{disguise}$, and $H_{disguise2}$ respectively. Then $$H_{private,B} \subset H_{disguise,B} \subset H_{disguise2,B} \text{ and } H_{disguise2,B} \cap H_{public,B} = \phi$$

Define $H_{disguise3} = H_{disguise2} \cap \overline{H_{disguise}}$ which is the pixel-wise AND between the two images with $\overline{H_{disguise}}$ being the negated (negative) image of $H_{disguise}$. Let the collection of the black pixel locations of $H_{disguise3}$ be $H_{disguise3,B}$ such that $H_{disguise3,B} \cap H_{disguise,B} = \phi$ and $$H_{disguise2,B} = H_{disguise3,B} \cup H_{disguise,B}$$

The black regions of $H_{disguise3}$ and $H_{private}$ are preferably disconnected. The elements of $H_{disguise3,B}$ are preferably not within 3×3 neighborhood of the elements of any $H_{private,k}$, and vice versa. Similarly, the black regions of $H_{disguise3}$ and $H_{public}$ are preferably disconnected. By construction, the boundary of $H_{disguise,B}$ cannot be obtained from $H_{disguise2}$.

As in the second embodiment, $H_{private}$ and $H_{public,B}$ can be decomposed into $L_1$ and $L_2$ M×N binary images respectively in the third embodiment.

$$H_{private} = \bigcup_{k=1}^{L_1} H_{private,k} \qquad H_{public} = \bigcup_{k=1}^{L_2} H_{public,k}$$

And $L_1+L_2+2$ halftone images are generated. The key-image $A_1$ is generated as before by applying regular error diffusion to R, with no data embedded. An image $A_1'$ is generated by applying SED to X with respect to $A_1$ to hide $H_{disguise}$. There are $L_1$ images, $$\{A_{private,k}\}_{k=1}^{L_1},$$

generated by applying SED to X with respect to $A_1'$ (instead of $A_1$) to hide the $$\{H_{disguise3} \cup H_{private,k}\}_{k=1}^{L_1}.$$

There are $L_2$ images, $$\{A_{public,k}\}_{k=1}^{L_2},$$

generated by applying SED to X with respect to $A_1'$ (instead of $A_1$) to hide the $\{H_{disguise3} \cup H_{public,k}\}_{k=1}^{L_2}$.

If $A_1'$ is overlaid with any one of $\{A_{private,k}\}_{k=1}^{L_1}$, the black regions of $H_{disguise3} \cup H_{private,k}$ would appear with lower-than-normal intensity. As the black regions of $H_{disguise3}$ and $H_{private,k}$ are disconnected, the black regions of $H_{private,k}$ should be clearly visible. Similarly, if $A_1'$ is overlaid with any one of $\{A_{public,k}\}_{k=1}^{L_2}$, the black regions of $H_{disguise3}$ and $H_{public,k}$ would be visible with lower-than-normal intensity. If $A_1'$ and $A_1$ are overlaid, the disguise foreground $H_{disguise,B}$ should appear with lower-than-normal intensity. In the third embodiment, $A_1'$ is the hidden-image reader. As $A_1'$ should not be distributed to the public, the hidden-image reader should not be available to the public. However, it is important that $A_1'$ cannot be generated with public knowledge. If $H_{disguise,B}$ can be identified and $A_1$ can be generated from publicly available R, $H_{disguise}$ would be known and it is possible to generate $A_1'$ by applying SED to X with respect to $A_1$ to hide $H_{disguise}$. Thus if $A_1'$ is not available to the public, the $H_{disguise}$ should not be recognizable.

If R is a publicly available image, $A_1$ can be generated. If the public has one of the $\{A_{private,k}\}_{k=1}^{L_1}$ and overlays it with $A_1$, the black regions of $H_{disguise2,B} = H_{disguise3,B} \cup H_{disguise,B}$ should appear with lower-than-normal intensity. Here the $H_{disguise,B}$ comes from $A_1'$ while the $H_{disguise3,B}$ comes from $H_{disguise3}$. In other words, the key image $A_1$ can read from $Y_{private,k}$ only the disguise image $H_{disguise2}$ but not the private image $H_{private,k}$. Note that the boundary of $H_{disguise,B}$ cannot be identified from $H_{disguise2,B}$ such that true hidden-image reader $A_1'$ cannot be generated. However, if anyone has two or more of the $\{A_{private,k}\}_{k=1}^{L_1}$ and overlays them, the black regions of the associated $A_{private,k}$ would be revealed.

If $A_1$ is overlaid with any of the $\{A_{public,k}\}_{k=1}^{L_2}$, the black regions of $H_{disguise2,B} = H_{disguise3,B} \cup H_{disguise,B}$ and the viewable foreground $H_{public,k,B}$ should appear with lower-than-normal intensity also. Again the $H_{disguise,B}$ comes from $A_1'$ while the $H_{disguise3,B}$ comes from $H_{disguise3}$. In other words, the key-image $A_1$ can still be used to read the publicly-viewable portion of H. It can read the disguise image $H_{disguise2}$ but not $H_{disguise}$.

If $\{H_{private,k}\}_{k=1}^{L_1}$ and $\{A_{public,k}\}_{k=1}^{L_2}$ are overlaid, the desired hidden pattern H should appear together. More than 2 intensity levels are possible as $\{A_{private,k}\}_{k=1}^{L_1}$ and $\{H_{public,k}\}_{k=1}^{L_2}$ may not be mutually disjoint.

Figure 25:
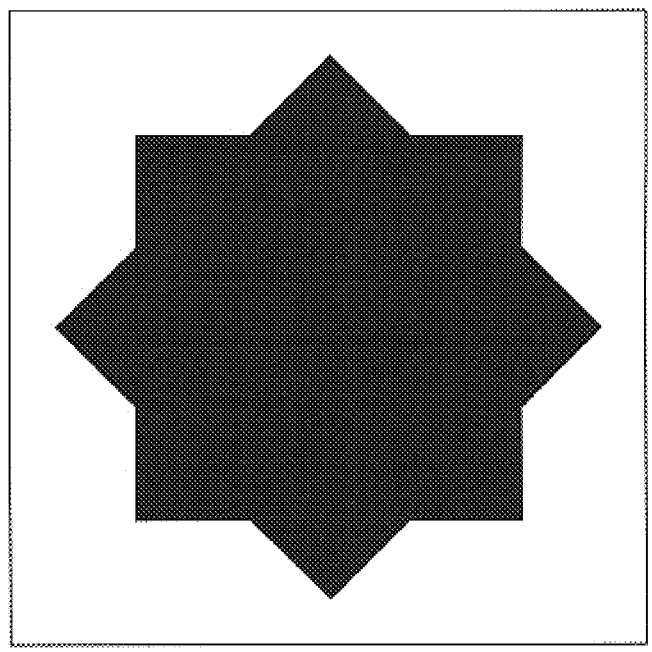
FIG. 25 shows a dataset ("$H_{disguise}$") used in a third embodiment of the invention.
Figure 26:
FIG. 26 shows an image hiding the dataset of FIG. 25.
Figure 27:
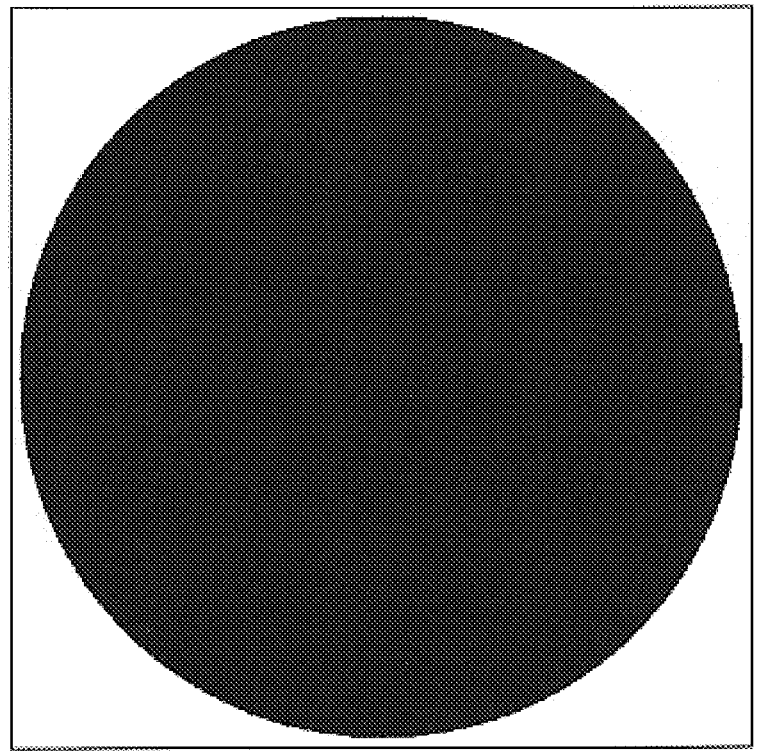
FIG. 27 shows a second dataset ("$H_{disguise2}$") used in the third embodiment.
Figure 28:
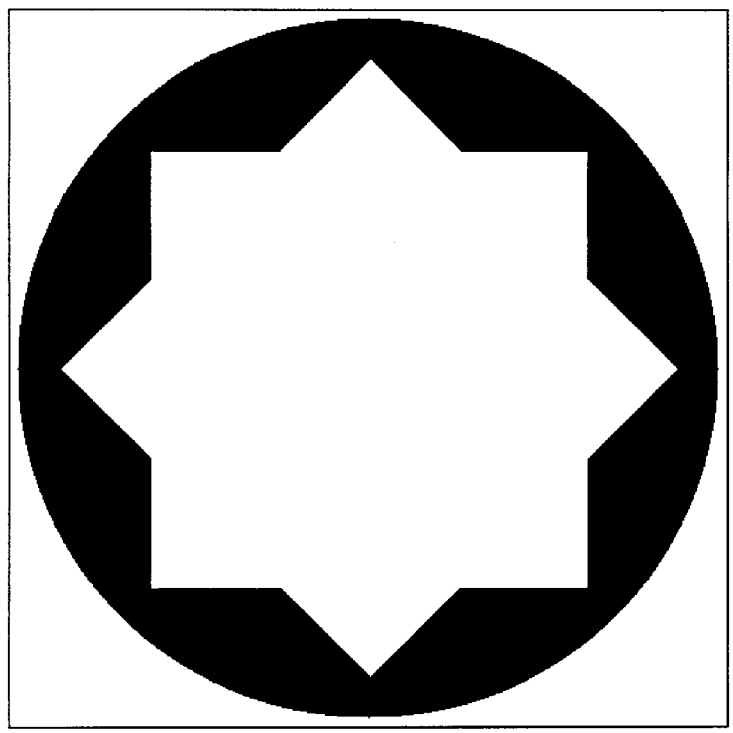
FIG. 28 shows a dataset ($H_{disguise3}$) derived from the datasets of FIG. 27 and FIG. 26.
Figure 29:
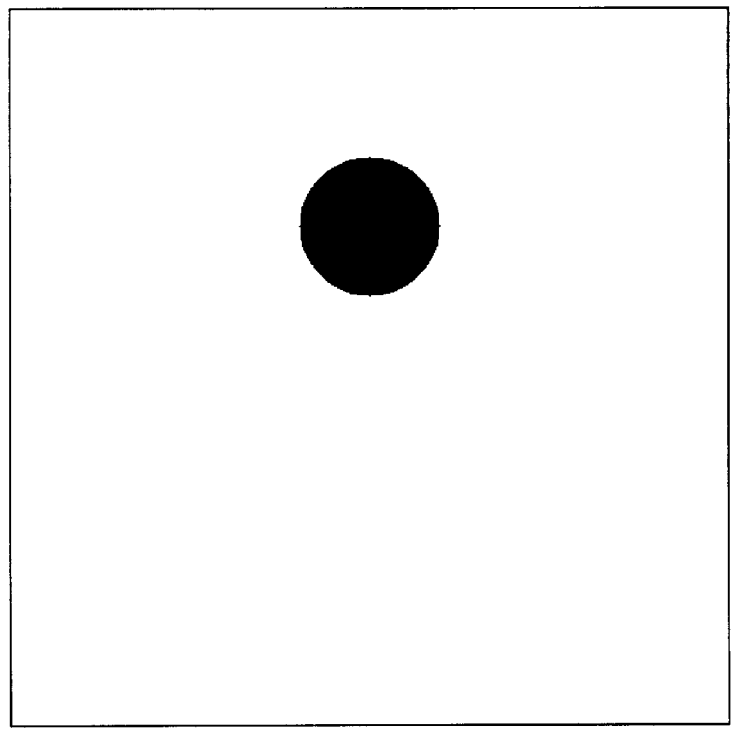
FIG. 29 shows a dataset ($H_1$) to be hidden in the third embodiment.
Figure 30:
FIG. 30 shows an image hiding the datasets of FIGS. 28 and 29.
Figure 31:
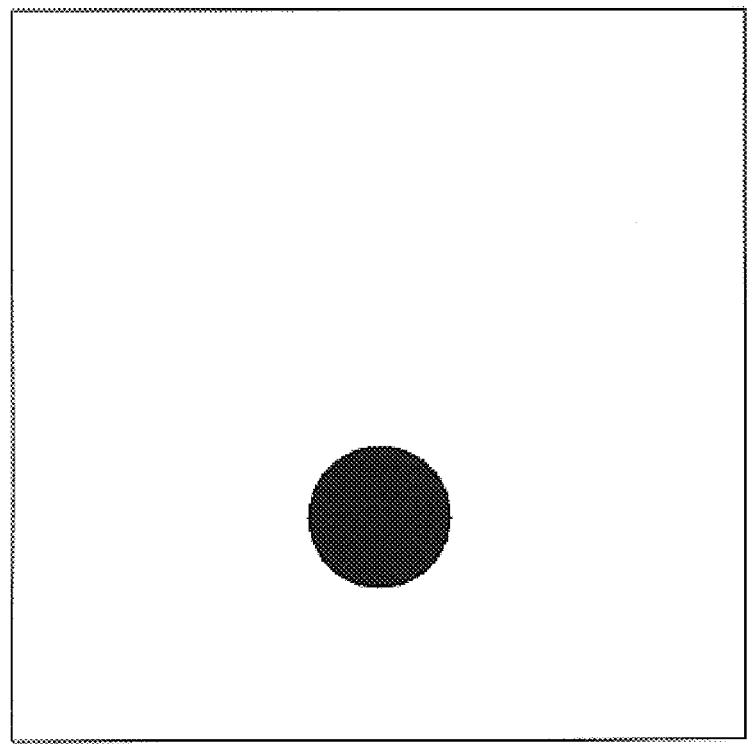
FIG. 31 shows a second dataset ($H_2$) to be hidden.
Figure 32:
FIG. 32 shows an image hiding with the datasets of FIGS. 28 and 31.
Figure 33:
FIG. 33 shows FIG. 26 and FIG. 30 overlaid.
Figure 34:
FIG. 34 shows two further images generated by the third embodiment overlaid, revealing the dataset of FIG. 27.
Figure 35:
FIG. 35 shows FIG. 26 and FIG. 32 overlaid.
Figure 36:
FIG. 36 shows two further images generated by the third embodiment overlaid, revealing the dataset of FIG. 27.
Figure 37:
FIG. 37 shows two further images generated by the third embodiment overlaid, revealing the dataset of FIG. 25.
Figure 38:
FIG. 38 shows FIGS. 30 and 32 overlaid.

FIGS. 25 to 38 show an example of the third embodiment. This example does not use any $H_{public}$, so the $H_{private,k}$ and $A_{private,k}$ are simply called $H_k$ and $A_{k+1}$ respectively. The black region of $H_{disguise}$ is larger than the black regions (the round dots) of $H_1$ and $H_2$, and is smaller than the black region of $H_{disguise2}$. FIG. 25 shows $H_{disguise}$. FIG. 26 shows $A_1'$ (with $H_{disguise}$ hidden). FIG. 27 shows $H_{disguise2}$. FIG. 28 shows $H_{disguise3}$ which is the AND of FIG. 27 and the inverse of FIG. 26. FIG. 29 shows $H_1$ to be hidden. FIG. 30 shows $A_2$ with $H_1$ and $H_{disguise3}$ hidden with respect to $A_1'$. FIG. 31 shows $H_2$ to be hidden. FIG. 32 shows $A_3$ with $H_2$ and $H_{disguise3}$ hidden with respect to $A_1'$. FIG. 33 shows $A_1'$ and $A_2$ overlaid, showing $H_1$ and $H_{disguise3}$. FIG. 34 shows $A_1$ and $A_2$ overlaid, showing $H_{disguise2}$. FIG. 35 shows $A_1'$ and $A_3$ overlaid, showing $H_2$ and $H_{disguise3}$. FIG. 36 shows $A_1$ and $A_3$ overlaid, showing $H_{disguise2}$. FIG. 37 shows $A_1'$ and $A_1$ overlaid, showing $H_{disguise}$. FIG. 38 shows $A_2$ and $A_3$ overlaid, showing $H_1$ and $H_2$.

Industrial Applicability

The proposed method can be applied to printers, book/newspaper/magazine publishing, greeting cards, toys, souvenirs, and identity cards.

In printers, it can be incorporated into the printer driver programs to embed hidden logos and text and patterns into printed images. The printed image can be the $A_2$ in the simple embodiment above. The hidden information can be visually inspected by overlaying $A_2$ with the other image $A_1$. The $A_1$ may be printed on a transparency. Possible useful hidden information includes the printer serial number or other printer information, creation date/time/place, author information, company information/logo, intended user information, secret message, image classification and rating information, etc. Such information may be used for authentication, copyright protection, archival indexing, and retrieval keys, etc. For this application, it is important to hide data in a way that would not affect the visual quality of the printout. The present method can give such high quality printouts.

In book/newspaper publishing, the present method can be used to embed special information in a selected image. The $A_2$ version can be printed while the $A_1$ can be printed on a transparency. The present method can also be used for copyright protection. Sometimes, some publishing house would illegally scan others' books and publish the book without permission. The present method can be used to detect the true book which would show the hidden image when overlaid by the other image $A_1$. But an illegally published book would not contain the watermark because the illegal scanning and printing tend to destroy the watermark in $A_2$. It is again important that the data hiding does not degrade the visual quality.

In greeting cards, both $A_1$ and $A_2$ can be printed on a transparency (or section of clear plastic). Or $A_2$ may be printed on one page while $A_1$ is printed on another page. When $A_1$ and $A_2$ are overlaid, the hidden message would appear. The hidden messages in this application tend to be the greeting messages such as 'happy birthday', 'I love you', etc. Similarly, the method can applied to hide cute pictures (e.g. Hello Kitty) or sentences on stationery or toys.

In identity cards, the present method can be used to hide identifying numbers for verification purpose. For example, the true ID number of a person P may be embedded in $A_2$ using the simple mode which is printed on P's identity card. The image $A_2$ may be a common image. Suppose someone copies the content of P's card to make a fake ID card for Q. Although the ID card of Q shows Q's ID number, it will be P's ID number that shows when $A_1$ is overlaid on $A_2$.

The primary advantage of preferred embodiments of the proposed method are that:
 a) It enables one to hide hidden data within halftone images (there are very few existing algorithms for this).
 b) The hidden data can be visually inspected when the resultant halftone images are overlaid.
 c) No special decoding mechanism, machine or program is needed. Decoding is done by visual inspection.
 d) the perceptual quality of the DHSED processed image is very high, effectively the same as the original halftone image.

What is claimed is:

1. A method for embedding hidden data in halftone images, the method employing a multi-tone image, which is based on an array of pixels and in which each pixel takes one of at least three tone values, and generating a first halftone image and a second halftone image, each of which is based on said array of pixels and in each of which each pixel takes either a first predetermined tone value or a second predetermined tone value, said first and second halftone images together hiding additional data, said additional data defining a partition of said array of pixels into a set of first pixels and a set of second pixels, the method comprising the steps of:
 using a first error diffusion process to convert the multi-tone image to said first halftone image;
 fixing the tone value of each first pixel of the second image to be the same as the tone value of that first pixel in the first image; and
 using a second error diffusion process and the multi-tone image to derive for each second pixel a tone value for the second halftone image which is statistically correlated with the tone value of the first halftone image for that second pixel;
 whereby the first and second halftone images each visually resemble the multi-tone image, and additional data is revealed when said first and second halftone images are overlaid.

2. A method according to claim 1 in which at each second pixel, the tone values of the first and second halftone images are independent samples from a distribution which gives the first predetermined value with a probability of p and the second predetermined value with a probability of 1−p, where the value of p for each second pixel is such that the expectation value of the tone value of the first and second halftone images is equal to the local average of the tone values of the multi-tone image at that second pixel.

3. A method according to claim 1 in which said multi-tone image is a grey-scale image in which each pixel takes one of 256 predefined tone values.

4. A method according to claim 1 further including generating a third halftone image, said third halftone image being based on the array of pixels and each pixel of the third halftone image have a tone value which is either the first predetermined value or the second predetermined value, said first and third halftone images together hiding further data, said third data defining a partition of said array of pixels into a set of third pixels and a set of fourth pixels, said third halftone image being generated by the additional steps of:
 fixing the tone value of each third pixel of the third image to be the same as the tone value of that third pixel in the first image; and
 using the second error diffusion process and the multi-tone image to derive for each fourth pixel a tone value for the third halftone image which is statistically correlated with the tone value of the first halftone image for that fourth pixel;
 whereby the third halftone image visually resembles the multi-tone image, said further data is revealed when said first and third halftone image are overlaid, and said further data and additional data are revealed when said second and third halftone images are overlaid.

5. A method according to claim 4 in which at each fourth pixel, the tone values of the first and third halftone images are independent samples from a distribution which gives the first predetermined value with a probability of p and the second predetermined value with a probability of 1−p, where the value of p for each fourth pixel is such that the expectation value of the tone value of the first and third halftone images is equal to the local average of the tone values of the multi-tone image at that fourth pixel.

6. A method according to claim 4 which includes a preliminary step of generating said further data and additional data from a fundamental data set, it being impossible to reconstruct said fundamental data set from either of said further data and said additional data individually.

7. A method of embedding hidden data in halftone images, the method transforming a multi-tone image, which is based on an array of pixels and in which each pixel takes one of at least three tone values, into a first halftone image and a second halftone image, each of which is based on the array of pixels and in each of which each pixel has a tone value which is either a first predetermined value or a second predetermined value, the first and second halftone images visually resembling the multi-tone image and correlations between the first and second images encoding hidden additional data, said additional data defining a partition of said array of pixels into a set of first pixels and a set of second pixels, the method comprising the steps of:
 (a) setting the tone value of the first halftone image at each respective pixel of the array using a predetermined threshold by, for successive given pixels along a predetermined path in said data array, performing the steps of:
  (i) defining in the data array a first neighborhood of the given pixel;
  (ii) using the tone value of the multi-tone image to calculate a first diffusion value for that given pixel,
  (iii) if the first diffusion value at the given pixel is above the threshold, setting the tone value of the given pixel of the first halftone image to the first predetermined value and defining a first error value for that given pixel as the difference between the first diffusion value and the first predetermined value, and (iv) if the first diffusion value at the given pixel is below the threshold, setting the tone value of the given pixel of the first halftone image to the second predetermined value and defining a first error value for the given pixel as the difference between the first diffusion value and the second predetermined value, said diffusion value at the given pixel being a weighted sum of (i) the tone value of the multi-tone image at the given pixel, (ii) the respective first error values of pixels in the first neighbourhood of the given pixel;

(b) setting the tone value of the second halftone image at each respective first pixel to be the same as the tone value of that first pixel in the first halftone image;

(c) setting the tone value of the second halftone image at each respective second pixel by, for successive given second pixels along a predetermined path in said array, performing the steps of:

(i) defining in the data array a second neighbourhood of the given second pixel;

(ii) using the tone value of the multi-tone image to calculate a second diffusion value for that given second pixel, (iii) if the second diffusion value at the given second pixel is above the threshold, setting the tone value of the second halftone image at the given second pixel to said first predetermined value and defining a second error value for that given second pixel as the difference between the section diffusion value and the first predetermined value, and (iv) if the second diffusion value at the given second pixel is below the threshold, setting the tone value of the second halftone image at the given second pixel to said second predetermined value and defining a second error value for that given second pixel as the difference between the second diffusion value and the second predetermined value, said second diffusion value at the given second pixel being a weighted sum of (i) the tone value of the multi-tone image at the given second pixel, (ii) the respective second error values of any second pixels in the second neighbourhood of the given second pixel, and (iii), for any first pixel in the second neighbourhood of the given second pixel, a modified error value which is different from the first error value for that first pixel.

8. A method according to claim 7 in which the first and second neighbourhoods of each second pixel are identical.

9. A method according to claim 7 in which the weighting of the components of the first diffusion value is according to the Steinberg or Jarvis kernels.

10. A method according to claim 7 in which the weighting of the components of the second diffusion value is according to the Steinberg or Jarvis kernels.

11. A method according to claim 7 in which, over the whole of the data array, the local average value said tone values of said first and second halftone images is substantially equal.

12. A method according to claim 7 in which said second pixels together define foreground regions in said array, the method further including:

(i) defining for each said foreground region a margin region in said array composed of first pixels proximate that foreground region, and (ii) determining said modified error value for each first pixel in said margin region using the tone values of the multi-tone image for first pixels in that margin region.

13. A method according to claim 7 in which said modified error value of each first pixel is limited to be within a predetermined range.

14. A method according to claim 7 in which said modified error value for each first pixel is said first error value subject to a random noise.

15. A method according to claim 7 further including generating a third halftone image, said third image being based on the array of pixels and each pixel of the third image have a tone value which is either the first predetermined value or the second predetermined value, the third halftone image visually resembling the multi-tone image and correlations between the first and third images encoding further data, said third data defining a partition of said array of pixels into a set of third pixels and a set of fourth pixels, by the steps of:

(d) setting the tone value of the third halftone image at each respective third pixel to be the same as the tone value of that third pixel in the first halftone image;

(e) setting the tone value of the third halftone image at each respective fourth pixel of the array by, for successive given fourth pixels along a predetermined path in said array, performing the steps of:

(i) defining in the data array a third neighbourhood of the given fourth pixel;

(ii) using the tone value of the multi-tone image to calculate a third diffusion value for that given fourth pixel, (iii) if the third diffusion value at the given fourth pixel is above the threshold, setting the tone value of the third halftone image at the given fourth pixel to said first predetermined value and defining a third error value for that given fourth pixel as the difference between the third diffusion value and the first predetermined value, and (iv) if the third diffusion value at the given fourth pixel is below the threshold, setting the tone value of the third halftone image at the given fourth pixel to said second predetermined value and defining a third error value for that given fourth pixel as the difference between the third diffusion value and the second predetermined value, said third diffusion value at the given fourth pixel being a weighted sum of (i) the tone value of the multi-tone image at the given fourth pixel, (ii) the respective second error values of any fourth pixels in the third neighbourhood of the given second pixel, and (iii), for any third pixel in the third neighbourhood of the given fourth pixel, a modified error value which is different from the first error value for that third pixel.

16. A method according to claim 15 in which said additional data and said further data together represent an encoding of a message which cannot be determined from either the additional data or the further data alone.

17. An apparatus for embedding hidden data in halftone images, the apparatus arranged to employ a multi-tone image, which is based on an array of pixels and in which each pixel takes one of at least three tone values, and to generate a first halftone image and a second halftone image, each of which is based on said array of pixels and in each of which each pixel takes either a first predetermined tone value or a second predetermined tone value, said first and second halftone images together hiding additional data, said additional data defining a partition of said array of pixels into a set of first pixels and a set of second pixels, the apparatus comprising a processor arranged to perform the steps of:

using a first error diffusion process to convert the multi-tone image to said first halftone image;

fixing the tone value of each first pixel of the second image to be the same as the tone value of that first pixel in the first image; and using a second error diffusion process and the multi-tone image to derive for each second pixel a tone value for the second halftone image which is statistically correlated with the tone value of the first halftone image for that second pixel;

whereby the first and second halftone images each visually resemble the multi-one image, and additional data is revealed when said first and second halftone images are overlaid.

18. A apparatus according to claim 17 which is further arranged to generate a third halftone image, said third halftone image being based on the array of pixels and each pixel of the third halftone image have a tone value which is either the first predetermined value or the second predetermined value, said first and third halftone images together hiding further data, said third data defining a partition of said array of pixels into a set of third pixels and a set of fourth pixels, said processor being arranged to perform the additional steps of:

fixing the tone value of each third pixel of the third image to be the same as the tone value of that third pixel in the first image; and using the second error diffusion process and the multi-one image to derive for each fourth pixel a tone value for the third halftone image which is statistically correlated with the tone value of the first halftone image for that fourth pixel;

whereby the third halftone image visually resembles the multi-tone image, said further data is revealed when said first and third halftone image are overlaid, and said further data and additional data are revealed when said second and third halftone images are overlaid.

* * * * *